United States Patent [19]

Sit et al.

[11] Patent Number: 5,010,508
[45] Date of Patent: Apr. 23, 1991

[54] PRENORMALIZATION FOR A FLOATING-POINT ADDER

[75] Inventors: Hon P. Sit, Fremont; David Galbi, Mountain View; Alfred K. Chan, San Jose, all of Calif.

[73] Assignee: Intel Corporation, Santa Clara, Calif.

[21] Appl. No.: 311,294

[22] Filed: Feb. 14, 1989

[51] Int. Cl.⁵ .................... G06F 5/01; G06F 7/50
[52] U.S. Cl. .................... 364/748; 364/715.04
[58] Field of Search .................... 364/748, 715.04

[56] References Cited

U.S. PATENT DOCUMENTS

| | | | |
|---|---|---|---|
| 4,338,675 | 7/1982 | Palmer et al. | 364/748 |
| 4,484,259 | 11/1984 | Palmer et al. | 364/754 |
| 4,779,220 | 10/1988 | Nukiyama | 364/748 |
| 4,905,178 | 2/1990 | Mor et al. | 364/748 |
| 4,922,446 | 5/1990 | Zurawski et al. | 364/748 |

OTHER PUBLICATIONS

ANSI/IEEE, IEEE Standard for Binary Floating-Point Arithmetic, Aug. 12, 1986.

Primary Examiner—David H. Malzahn
Attorney, Agent, or Firm—Blakely, Sokoloff, Taylor & Zafman

[57] ABSTRACT

In a floating-point subtraction of two numbers where a normalized result is needed, a prenormalization circuit predicts the number of leading zeroes which will appear in the resultant mantissa, due to the close value of the two source operands. The prenormalization circuit then causes appropriate left shifts of the two operand mantissas prior to the subtraction (two's complement addition) is performed, wherein the resultant mantissa will already be normalized.

16 Claims, 4 Drawing Sheets

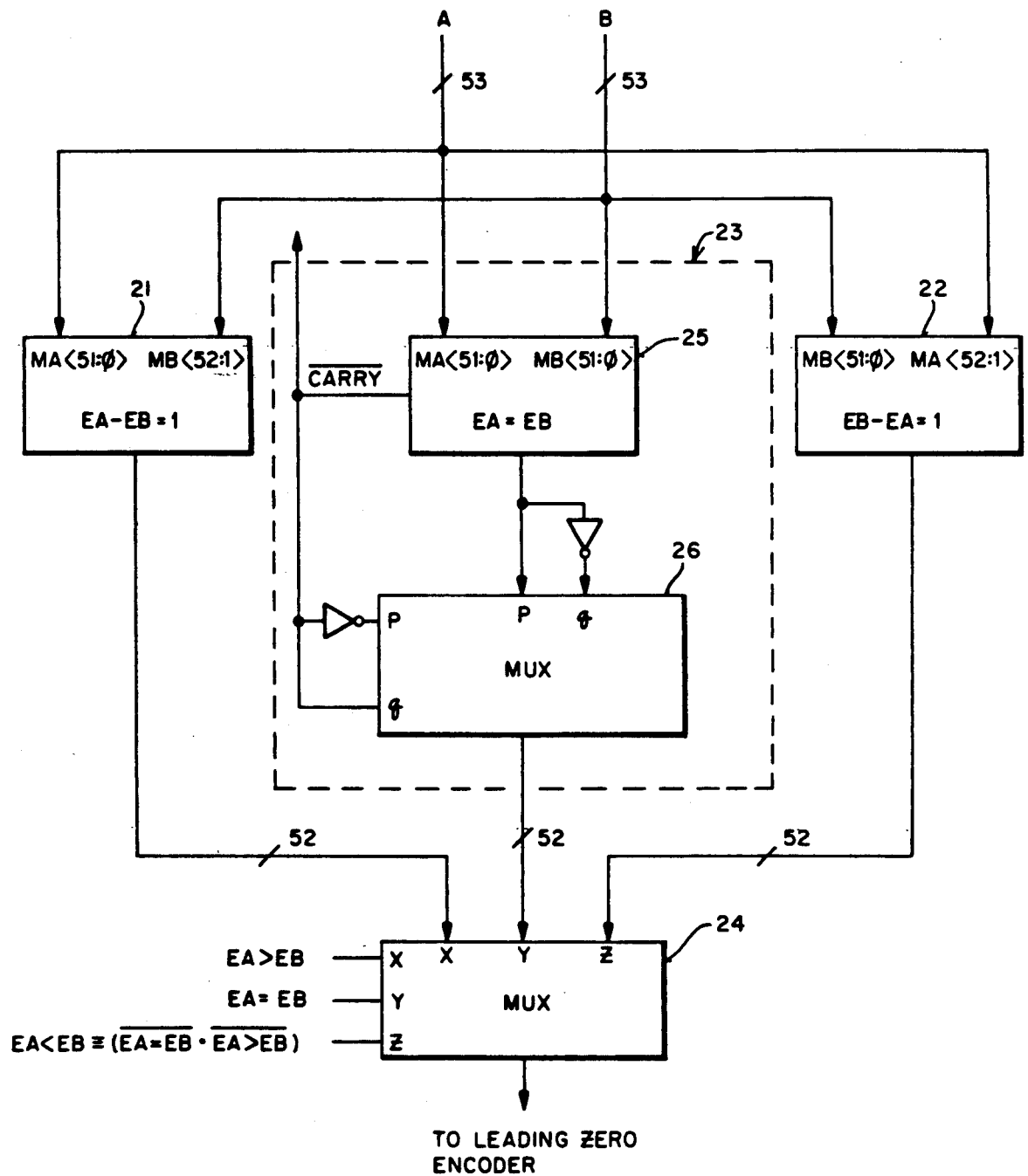
FIG_1

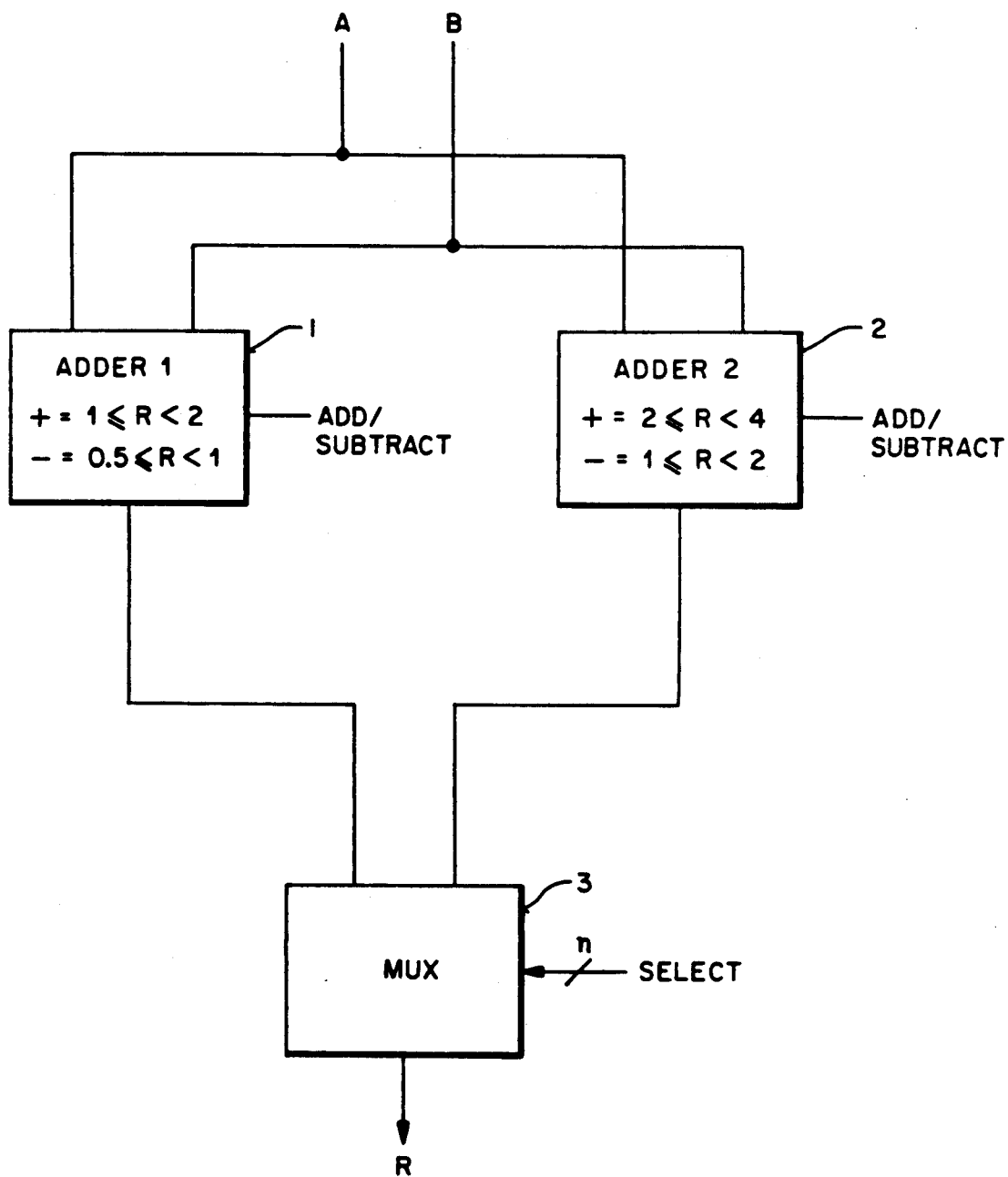

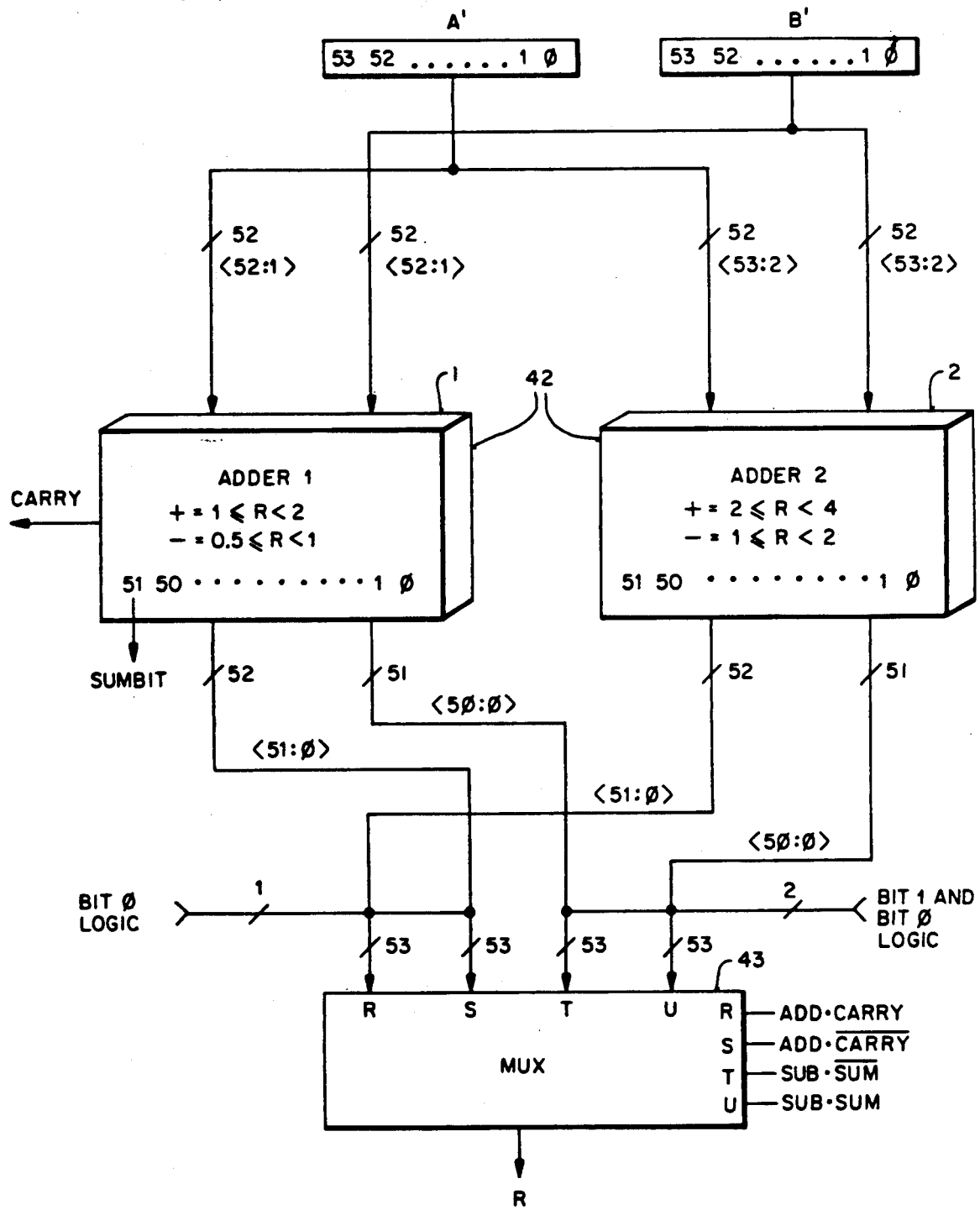

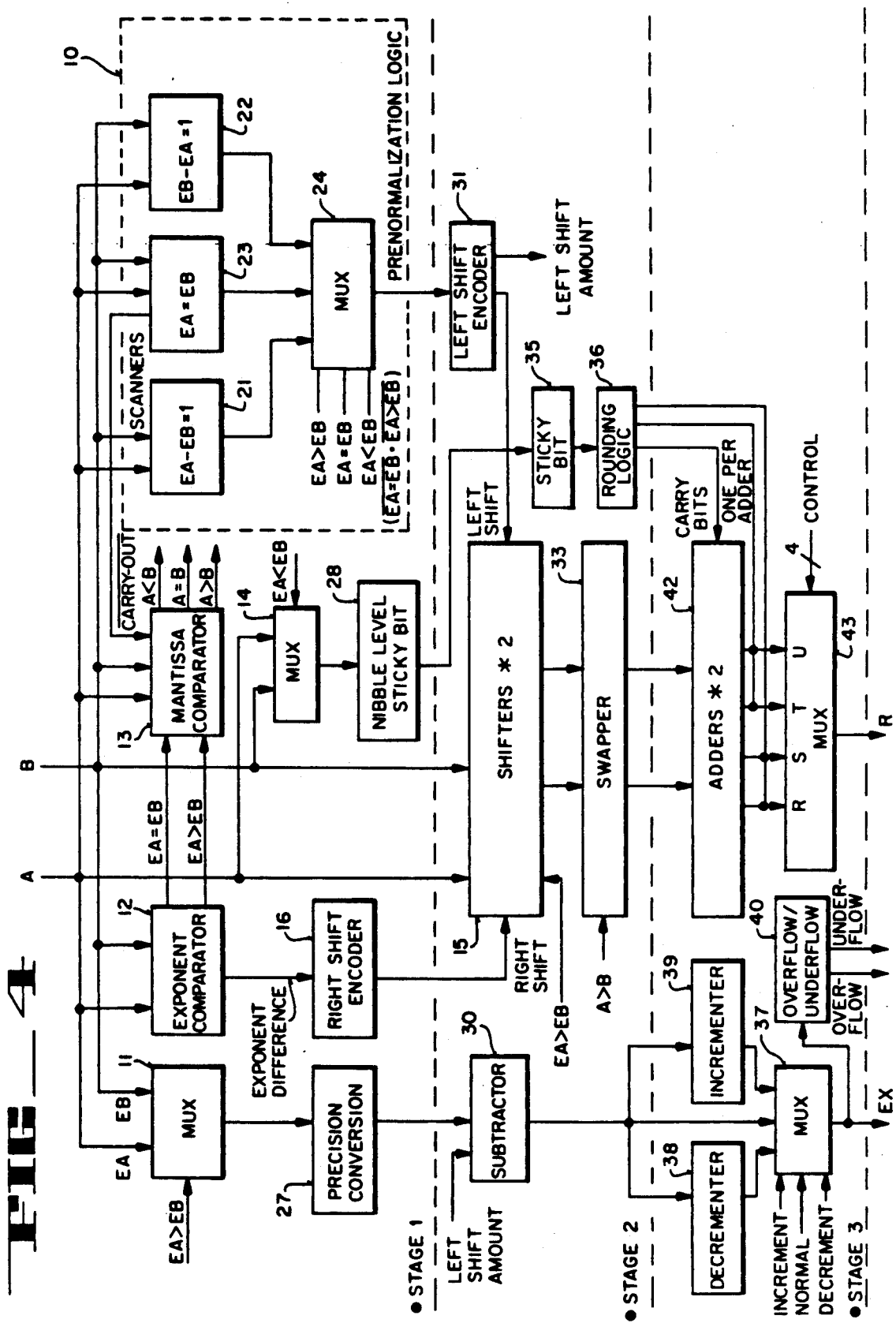

PRENORMALIZATION FOR A FLOATING-POINT ADDER

BACKGROUND OF THE INVENTION

1. Field of the Invention

The present invention relates to the field of digital adders and more specifically to the addition and subtraction of floating point numbers.

2. Related Application

This application relates to copending application Ser. No. 311,296, filed Feb. 14, 1989, and entitled "Rounding Logic for a Floating-Point Adder."

3. Prior Art

The heart of any computer or microprocessor is the processor itself. One primary function of any processor is its ability to perform arithmetical or logical operations on various inputs to the processor. Various schemes are known in the prior art to provide arithmetic and logic operations in the processor. One necessary arithmetic function inherent in most processors is its ability to add two numbers. The numerical operation of adding two numbers to derive a sum in a digital processor is well-known in the prior art. Further, the operation of subtracting one number from a second number to derive a difference is also well-known in the prior art. Typically, complement addition is utilized to obtain the subtraction operation in most digital processors.

However, implementing such an operation in a computer or a processor entails the difficulty of using hardware circuitry to provide the sum and/or difference of the two numbers. As processors are reduced to a semiconductor device, i.e. on a silicon chip, additional constraints play a role in determining the best scheme for adding and/or subtracting two numbers. Additionally, improving the speed of the adder is especially important when the adder is on the same integrated circuit chip as other circuits which provide other processing functions, because the time needed to perform the addition provides the dominant delay, rather than the inter-chip communication time. Therefore, any reduction in the computation time of adding/subtracting two numbers significantly improves the speed of the processor.

One of the more efficient and precise techniques of adding and/or subtracting two numbers employs the use of adders to perform floating point operations. In a floating point operation, numbers are represented by an exponent and a mantissa. The mantissa is normalized so that there is one non-zero digit to the left of the decimal (or binary) point. For example, a decimal number 4956.43 would be represented as $+4.95643 e+3$. In a binary operation which is used in the digital processors, the normalized mantissa will be represented by having a value of 1 as its most significant bit (msb) followed by the floating point.

In a conventional floating point addition/subtraction scheme known in the prior art, the following steps are typically required to solve the sum/difference of two numbers. During the first step, the exponents of the two source operands are compared and subtracted. In the second step, mantissa alignment is achieved by having the mantissa of the smaller operand right shifted by the exponent difference. In the third step mantissas are added, if addition is to be performed. If subtraction is to be performed, then typically a two's complement addition is performed. In step four, the result is post complemented if the result has a negative value. In the fifth step, leading zero detection is performed, generally by using a leading zero encoder to scan for a number of leading zeros. The result will typically have leading zeros, if in subtracting two source operands the operands are very close to each other in magnitude. In step six, post normalization is achieved by causing the mantissa to be shifted left by the number of leading zeros in order to normalize the obtained mantissa. Generally at the same time, the common exponent will be subtracted by the shifted amount. In step seven, a rounding operation is performed. This step is basically another add operation to round the least significant bit (lsb) of the result. Finally, in step eight, if the rounding operation of step seven results in an overflow, then the mantissa will be shifted right and the exponent of the resultant mantissa will be incremented to compensate for the overflow.

Although various floating-point standards are available, one of the most well-known floating point standard which is widely accepted is the IEEE (Institute of Electrical and Electronic Engineers, Inc.) Binary Floating Point Standard 754. However, in implementing the IEEE 754 floating point standard, the above prior sequence of steps is typically performed in a serial fashion. That is, a given step must wait until a result has been obtained in the previous step before that given step can be executed.

It is appreciated then that any reduction in the total number of clock cycles to perform an addition/subtraction operation will provide a faster processor for performing the addition/subtraction operation.

Further, in the implementation of the IEEE Binary Floating Point Standard 754, a precise rounding requirement for the result is needed. The IEEE 754 standard requires the use of a round bit and a sticky bit when performing floating point operations. The round bit is defined as the bit of the unrounded mantissa result that is one position less significant than the lsb used in the resultant mantissa. The sticky bit is defined as the OR of all of the bits in the unrounded mantissa result less significant than the round bit. The existing prior art implementations require the calculation of all or part of the resultant mantissa before the rounding can be calculated. Additionally, as noted in step eight above, a rounding operation may result in an overflow, requiring the mantissa to be shifted one position to the right. Therefore, a step is needed to determine the rounding action and the addition, and another step is needed to post shift the overflowed result, if any.

Again, it is to be appreciated that if the rounding can be determined before the resultant mantissa is obtained, then the sequence of steps, in terms of clock cycles, and possibly an extra rounding adder, in terms of hardware, can be reduced, thereby increasing the overall speed and performance of the processor.

SUMMARY OF THE INVENTION

The present invention describes a floating-point adder in which prenormalization logic is used to determine the shifts required to obtain a normalized resultant mantissa, and in which rounding logic employing a dual adder scheme is used to anticipate the rounding required of an unrounded resultant mantissa. The floating-point adder is capable of receiving two operands, perform an addition/subtraction operation and provide a final rounded sum/difference in three clock cycles.

During a first clock cycle the prenormalization logic scans the operand mantissas to perform a logic operation to predict the number of leading 0s expected in the resultant mantissa. The prenormalization logic operation is dependent on the difference of the exponent values of the two source operands. Prenormalization is needed when the exponent values are equal or has a difference of one. The exponent difference, along with an evaluation as to which operand is greater, is being performed during the first clock cycle. Then, the proper logic operation output is selected, which output depending on the evaluation of the operand magnitude. Also during the first cycle, the smaller operand is scanned to determine the sticky bit.

During the second clock cycle, the prenormalization circuit causes appropriate left shifts of the shift registers containing the operand mantissas, as well as adjusting the exponents. This left shift operation of the mantissas ensures the removal of leading 0(s), which would have manifested in the answer. Thus, postnormalizing of the result is not needed. Also during the second clock cycle, rounding needed for the result is precalculated. Further, a swapper is used to ensure that the larger operand is used as the minuend.

During a third clock cycle, two adders operate on the operand mantissas to provide the addition/subtraction. Because a carry-out can be generated in an addition operation and a place holding 0 can be generated in a subtraction operation, a dual adder scheme is used. If addition is being performed, one adder assumes no carry-out, while the other adder assumes a carry out and effectively shifts the second result one bit position to the right. If subtraction is being performed, one adder assumes the sum bit to be 1, while the other adder assumes a leading 0 in the sum bit and effectively shifts the second result one bit position to the left. A logic circuit detects the carry-out/sum bit value to select the output of the adder having the properly normalized result. Exponent adjustments are also made by control signals from the same logic scheme also during this third clock cycle.

BRIEF DESCRIPTION OF THE DRAWINGS

FIG. 1 is a schematic diagram illustrating a prenormalization circuit of the present invention.

FIG. 2 is a schematic diagram illustrating a two adder scheme of the present invention.

FIG. 3 is a schematic diagram illustrating a two adder scheme of the preferred embodiment and showing the processing of two 53-bit mantissas.

FIG. 4 is a schematic diagram showing a floating-point adder of the present invention.

DETAILED DESCRIPTION OF THE PRESENT INVENTION

An apparatus and a method for providing prenormalization and rounding logic using a two-adder scheme to improve the speed and performance of a floating point adder is described. In the following description numerous specific details are set forth such as specific circuits bit patterns, etc., in order to provide a thorough understanding of the present invention. It will be obvious, however, to one skilled in the art that the present invention may be practiced without these specific details. In other instances well-known structures and methods have not been described in detail in order not to unnecessarily obscure the present invention. It is to be appreciated that in the following description addition refers to an operation on which the magnitude of the resultant is greater than both of the operand mantissas. For example, $1-(-2)$ is an addition operation (for the purpose of the description which follows). Accordingly, subtraction is when the magnitude of the resultant is less than magnitude of at least one of the operands, for example, $1+(-2)$ is a subtraction operation.

In a floating point add/subtract operation, two operands are added/subtracted to provide a sum/difference result. Generally, the two operands, having an exponent portion and a mantissa portion, are normalized so that a non-zero value (value of one in binary) is at the msb position. Sometimes, this 1 value at the msb position is referred to as a hidden 1 because it is known that when normalized, a 1 is always at this bit position, followed by the floating point. The exponent is incremented/decremented to compensate for the shifts required for normalization.

When the two source operands (hereinafter referred to as operand A and operand B) are added/substracted, the resultant operand mantissa must also be normalized. This post normalization is referenced in step six in the earlier background description. It is to be noted that during an addition operation, the most significant bit of the resultant mantissa will have a value of 1 if there is no carry out (no overflow from the adder), or it will have a value of 0 or 1 in the event there is a carry (overflow from the adder). Therefore, in the addition of two operands A and B, the resultant mantissa will require no post normalization, or in the worst case a shifting of one bit position to the right.

However, post normalization in the case of a subtraction operation is more uncertain. In the event the two numbers are close in value, the resultant difference usually has leading zeros, such as 000001XXXXXXXXXX, showing an example of a sixteen bit resultant mantissa having five leading zeros. In this example a post normalization step requires a number of left shifts to normalize the difference. Therefore, for post normalization requirements for a subtraction operation, it is essential to determine the number of leading zeros in the resultant mantissa.

In order to provide a faster performance in performing a subtraction operation, the present invention eliminates the requirement of a post normalization step. Instead, the present invention utilizes prenormalization, wherein prenormalization is defined as determining the normalization requirement for the resultant mantissa before the resultant mantissa is obtained. It is to be appreciated that in the examples provided below, the subtraction operation is shown having one mantissa subtracted from the other. That is, the subtrahend is subtracted from the minuend. However, it is to be appreciated that in the actual digital processing technique, the subtraction is performed by two's complement adders. The use of two's complement adders is well known in the prior art.

PRENORMALIZATION

In the prenormalization technique for a floating point adder of the present invention, three possible cases must be understood in order to determine when prenormalization is needed. The three cases are:

| | |
|---|---|
| Case I | $|EA - EB| = 1$, |
| Case II | $|EA - EB| > 1$, and |
| Case III | $EA = EB$, | where EA refers to the exponent of operand A and EB refers to the exponent of operand B.

The first case deals with a situation when the absolute value of EA minus EB equals one. That is, $EA-EB=1$ or $EB-EA=1$. The following illustrates the instance when $EA-EB=1$. In this instance, the mantissa of operand B must be shifted to the right by one position in order to align the mantissas as shown below.

| mantissa A | 1XXXXXXX |
|---|---|
| mantissa B | 01XXXXXX |

In order to determine if any leading zeros will appear, an analysis of four categories must be made. In the example below, operand A mantissa is normalized, wherein a value of 1 is present at its most significant bit position. As referenced earlier, this normalized 1 is typically referred to as a "hidden" 1. Further, in the example below, X's are used to denote digits which can be either a zero or a one.

In the first category for case I, the bit following the hidden 1 in mantissa A has a value of one. Because of the subsequent bit values, a borrow is pending. The operative result for case $I_A$ is shown below, wherein the bit following the hidden 1, along with a determination of a pending borrow, are the primary concern.

Case $I_A$) 1 following the hidden 1 in mantissa A—with borrow

| mantissa A | 11XXXXXX |
|---|---|
| mantissa B | 01XXXXXX |
| mantissa R | 01XXXXXX |

The resultant mantissa (mantissa R) will always have one leading zero in this instance and a shift left by one position is required to normalize the resultant mantissa.

In the second category, a 1 follows the hidden 1 in mantissa A and no borrowing is pending from the subsequent bit position.

Case $I_B$) 1 following the hidden 1 in mantissa A—without borrow

| mantissa A | 11XXXXXX |
|---|---|
| mantissa B | 01XXXXXX |
| mantissa R | 10XXXXXX |

In this instance the result is already normalized and shifting is not required.

The third category covers the situation when a 0 follows the hidden 1 in mantissa A and there is a borrow pending.

Case $I_C$) 0 following the hidden 1 in mantissa A—with borrow

| mantissa A | 10XXXXXX |
|---|---|
| mantissa B | 01XXXXXX |
| mantissa R | 00XXXXXX |

In this instance, the actual number of leading zeros in the resultant mantissa is indeterminate.

Finally in the fourth category, a 0 follows the hidden 1 of mantissa A and there is no borrow pending.

Case $I_D$) 0 following the hidden 1 in mantissa A—without borrow

| mantissa A | 10XXXXXX |
|---|---|
| mantissa B | 01XXXXXX |
| mantissa R | 01XXXXXX |

In this instance one leading 0 occurs, wherein a left shift of one position will normalize the resultant mantissa.

For the four categories listed above, there is only one case in which a pattern of indeterminate number of leading zeros is created. In case $I_C$, the actual number of leading zeros cannot be determined simply by looking at the bit following the hidden 1 in mantissa A and determining if a borrow is pending. The other three cases, $I_A$, $I_B$ and $I_D$, can, at most, generate one leading 0.

In case $I_A$, $I_B$ and $I_D$, mantissa R will have zero or one leading 0. The one leading 0 occurs from the need to borrow from the hidden one. This leading 0 occurence in subtraction, due to a borrow from the msb is opposite to an overflow occurring in the addition of two mantissas. As will be shown later, the two adder scheme of the present invention compensates for the occurrence of the one leading 0 in a subtraction operation or a carry in an addition operation. However, in case $I_C$ the actual number of leading 0s is indeterminate and some other technique is needed to solve the actual number of leading 0s that will occur in mantissa R. The one pattern which creates leading 0s for case $I_C$ when borrow is pending is shown in the example below (note that mantissa B has been shifted one position).

| mantissa A | 10000XXX |
|---|---|
| mantissa B | 01111XXX |
| mantissa R | 00000XXX |

That is, the pattern which produces leading 0s is determined by a number of 0s following the hidden 1 in mantissa A and a number of 1s following a leading place holding 0 in mantissa B. A scanner can be readily implemented to determine the number of leading 0s in the result by examining the 0/1 pairs in mantissas A and B.

Although a distinction can be noted in case $I_C$ above in comparison to the other case I conditions, in practice the borrow cannot be detected until the subtraction operation has been performed. However, the scanning for the 0/1 pair operates to identify leading 0s for all cases $I_A$, $I_B$, $I_C$ and $I_D$. The resulting prediction of the number of leading 0s in the resultant may be off by one, this error is corrected by the two adder scheme of the present invention.

Consider the example bit pattern below

| mantissa A | 10000X... |
|---|---|
| mantissa B | 01111Y... | where X and Y are subsequent bits of mantissa A and mantissa B, respectively, and where $X \neq 0$ or $Y \neq 1$.

If N is defined as the number of bit positions having the 0/1 pattern, then $N=4$ in the example of the above pattern. The scanner will detect the 0/1 bit pattern and will arrive at a value of 4 in the example pattern above. However, for bits X and Y, if every bit combination is evaluated (except for $X=0$ and $Y=1$) for borrow and no borrow conditions, it is noted that the resultant difference will have either N leading 0s or $N+1$ leading 0s, as shown below.

| mantissa A | 10000X... |
|---|---|
| mantissa B | 01111Y... |
| mantissa R₁ | 000010 |
| mantissa R₂ | 000001 |
| mantissa R₃ | 000011 |

As exemplified the scanner will detect the correct number of 0s if N leading 0s are in the result, or the scanner will be off by one if N+1 leading 0s are actually in the result (i.e. mantissa $R_2$). It is to be appreciated that case $I_D$ is actually represented by the above bit pattern, in which it is a special case having only a single 0/1 bit combination (N=1).

Thus, by scanning for the 0/1 bit combination, the number of leading 0s which will appear in the result can be predicted (to an error of one bit position, which error, if any, is corrected in the two adder scheme) when EA−EB=1. As will be described later, when EB−EA=1, the same description above to case I applies except that now mantissa B is the minuend and mantissa A is the subtrahend.

The prenormalization scheme of the present invention implements a logic circuit to determine the number of leading 0s which will occur in mantissa R when case I is encountered. All of the bits of mantissa A (assuming EA−EB=1), except for the hidden 1, are complemented and an AND operation is performed with the shifted bits of mantissa B, exclusive of the leading place holding 0. Then, complementing the ANDed result provides N leading 0s which corresponds to the number of leading 0s, or one less, which will appear in mantissa R. It is to be noted that this logic circuit for detecting the pattern which produces the leading 0s in case $I_C$, is also operative on cases $I_A$, $I_B$, and $I_D$ which also produces the correct number of leading 0s or, at most, off by one. That is, this logic circuit operates on mantissas A and B to determine the number of leading 0s expected in mantissa R when case I is encountered. It is appreciated that the two-adder scheme described later will compensate for the occurrence of a lead zero caused by a borrow from the hidden 1 in mantissa A thereby correcting for the one leading 0 error, if any.

The second case, case II, occurs when the absolute value of (EA−EB) is greater than one. Again, mantissa A is normalized to have a 1 at its most significant bit position and the second operand mantissa will need to be shifted to the right by at least two positions to align the exponents EA and EB in order to perform the subtraction operation. In considering just a two position shift, the following occurs:

| mantissa A | 1XXXXXXX |
|---|---|
| mantissa B | 001XXXXX |

In order to determine if any leading zeros are to appear, eight separate categories must be analyzed. The eight different categories are listed below as $II_A$ through $II_H$. In the first category, 11 follows the hidden 1 in mantissa A where there is no borrow pending from the subsequent bits.

Case $II_A$) 11 following the hidden 1 in mantissa A—without borrow

| mantissa A | 111XXXXX |
|---|---|
| mantissa B | 001XXXXX |

-continued

| mantissa R | 110XXXXX |
|---|---|

In this category, the resultant mantissa is already normalized.

The second category is the same as the first category but with a borrow pending.

Case $II_B$) 11 following the hidden 1 in mantissa A—with borrow

| mantissa A | 111XXXXX |
|---|---|
| mantissa B | 001XXXXX |
| mantissa R | 101XXXXX |

Again, the resultant mantissa is normalized.

The next two categories deal with the situation when one 0 follows the hidden 1 in the mantissa of operand A. In case $II_C$, a borrow is not pending.

Case $II_C$) 10 following the hidden 1 in mantissa A—without borrow

| mantissa A | 110XXXXX |
|---|---|
| mantissa B | 001XXXXX |
| mantissa R | 101XXXXX |

The resultant mantissa is already normalized.

In category $II_D$ one 0 follows the hidden 1 wherein a borrow is needed.

Case $II_D$) 10 following the hidden 1 in mantissa A—with borrow

| mantissa A | 110XXXXX |
|---|---|
| mantissa B | 001XXXXX |
| mantissa R | 100XXXXX |

Again the resultant mantissa is already normalized. As can be seen by the above four categories, whenever a 11 or a 10 follows the hidden 1 in mantissa A, the resultant mantissa R has a normalized result regardless of the borrow condition.

However, in the instance a 01 or a 00 follows the hidden 1 in mantissa A the resultant mantissa R may not be normalized as can be seen in the following example categories. In the instance a 01 follows the hidden 1 and a borrow is not pending from the subsequent bits, the following occurs.

Case $II_E$) 01 following the hidden 1 in mantissa A—without borrow

| mantissa A | 101XXXXX |
|---|---|
| mantissa B | 001XXXXX |
| mantissa R | 100XXXXX |

As can be seen from the resulting mantissa, the result is already normalized.

However, in the same instance when a borrow is needed the following occurs.

Case $II_F$) 01 following the hidden 1 in mantissa A—with borrow

| mantissa A | 101XXXXX |
|---|---|
| mantissa B | 001XXXXX |
| mantissa R | 011XXXXX |

The resulting mantissa has one leading zero, wherein one left shift will be needed to normalize the resulting mantissa.

As can be seen from the following two categories when a 00 follows the hidden 1 in mantissa A, one leading 0 results and one left shift will be required to normalize mantissa R.

Case II$_G$) 00 following the hidden 1 in mantissa A—without borrow

| mantissa A | 100XXXXX |
| mantissa B | 001XXXXX |
| mantissa R | 011XXXXX |

Case II$_H$) 00 following the hidden 1 in mantissa A—with borrow

| mantissa A | 100XXXXX |
| mantissa B | 001XXXXX |
| mantissa R | 010XXXXX |

It is to be noted that of the eight categories above covering the various possible combinations, when the absolute value of (EA−EB) is greater than 1, the resultant mantissa R will always be normalized, or at worst, one leading zero is encountered. The two adder scheme will compensate for this one leading 0. Therefore a special prenormalization circuit is not required for all eight categories of case II.

The third and final case deals with the worst case scenario when EA equals EB. In this instance, because both the exponents are of the same power, both mantissas of operands A and B will have leading 1's in the mantissa. This is shown below.

| mantissa A | 1XXXXXXX |
| mantissa B | 1XXXXXXX |

As can be seen for case III, a whole variety of patterns can produce leading zeros of indeterminate length. Two of those examples are shown below.

| mantissa A | 1111XXXX |
| mantissa B | 1111XXXX |
| mantissa R | 0000XXXX |
| mantissa A | 1000XXXX |
| mantissa B | 1000XXXX |
| mantissa R | 0000XXXX |

The number of available patterns which can produce leading 0s in case III is significantly large that no simple logic circuit solution is available. Rather, in the event case III is encountered, a subtracter is utilized to perform the subtracting of mantissas A and B. A subtracter is used in the prenormalization circuit of the present invention the event case III is encountered. In reviewing the earlier described three cases for performing a subtraction of two numbers, a conclusion can be made that the prenormalization logic is required in only two cases. That is, when the exponent difference equals zero or one. Further, the prenormalization logic is essential when looking for those instances when a left shift by more than one bit position is required to normalize the resultant mantissa R.

Refering to FIG. 1, a prenormalization circuit 10 of the present invention is shown. The prenormalization circuit 10 utilizes the earlier described scheme in the event case I and III is encountered and generates a number of leading zeroes which is to be expected in mantissa R. The prenormalization detection scheme described earlier assumes that operand A is greater in value than operand B. However, it is possible that operand B may be greater than operand A. Circuit 10 provides for either condition to occur.

Mantissas of both operands A and B are coupled to Circuits 21, 22 and 23. In FIG. 1, mantissas A and B are comprised of 53 bits, <52:0> (hereinafter <m:n> refers to bits m through n with m>n), to illustrate the use of IEEE 754 standard in performing double-precision arithmetic, however, the actual number of bits is a design choice. Two equivalent logic circuits 21 and 22 scan for the 0/1 bit combination pattern in the event case I occurs. Circuit 21 assumes that operand A is greater than operand B. Because an effective right shift is needed for mantissa B, circuit 21 aligns bits <51:0> of mantissa A to bits <52:1> of mantissa B. The hidden 1 of mantissa A is not used.

Alternatively, circuit 22 assumes that operand B is greater than operand A and aligns bits <51:0> of mantissa B to bits <52:1> of mantissa A and scans for the 0/1 bit combination pattern. Both circuits 21 and 22 assume that the exponent differential is one.

Circuit 23 is essentially a subtracter for subtracting the two mantissas A and B. Circuit 23 assumes that the mantissas A and B are of the same exponential order. Circuit 23 is comprised of subtracter 25 and multiplexer (MUX) 26. Subtracter 25 performs the subtraction operation by subtracting operand B from operand A and providing the difference as an input (p) to MUX 26. In the event operand B is greater than operand A, an inverted output of subtracter 25 is also provided as an input (q) to MUX 26. A carry/ (hereinafter/ is used to denote a complement and an active low signal) output is coupled to MUX 26 for selecting either the p or the q inputs to be coupled through MUX 26. That is, carry/- will be low (0) when a carry is present.

The subtracter 25 of the preferred embodiment always subtracts mantissa B from mantissa A. If mantissa A is greater than or equals to mantissa B, a number of leading 0s, if any, will be provided at the output of the subtracter 25. Because there will be a carry, carry/equals 0 and p input is selected.

If mantissa B is greater than mantissa A, a negative result will occur. Because of the complement addition, this negative result means that there will be leading 1s in place of leading 0s. Further a carry will not be generated (carry /=1) from substracter 25, which causes input q to be selected. Input q is the inverted output of subtracter 25. That is, input q is the inverted version of the negative result, wherein the inversion converts leading 1s to leading 0s.

It is to be noted that the actual polarity of the difference is not of concern because circuit 23 is interested in determining the number of leading 0s. The inverter result being off by a value of one (two's complement addition requires a one to be added to the result) will cause at most one leading 0 less in the final result, which will be corrected by the selection of the proper adder in the two adder scheme. Therefore, it is possible that the inverted output will provide a number of leading 0s which may be off, at most, by one in predicting the actual number of 0s in the resultant mantissa R. However, again, the two adder scheme of the present invention corrects for this error.

The outputs of the three circuits 21–23 are coupled as inputs to MUX 24. Control signals EA>EB, EA=EB and EA<EB select its appropriate inputs from circuits 21, 23 and 22, respectively, as an output from MUX 24. It is to be appreciated that only two control signals are actually needed since EA<EB condition can be logically represented as (EA=EB)/and (EA>EB)/. Further, it will be later shown that when the exponent difference is greater than one (i.e. case II), the output from MUX 24 is subsequently not used.

As will be described later a resultant mantissa requiring a single left shift for normalization will be solved by the use of the two adder scheme of the present invention. Thus, the prenormalization circuit 10 of the present invention determines the expected number of leading 0s in mantissa R and this output of leading 0s causes appropriate shifts of the operand mantissas prior to the subtraction of the operand mantissas. The resultant mantissa R will be normalized without requiring any post normalization step. It is to be appreciated that circuit 23 can implement two subtracters (one for A>B and one for B>A) or that circuits 21 and 22 can also provide equivalent functions using subtracters, but the present invention refrained from such practice since subtracters require sigificantly more silicon space as compared to other logic circuits, such as gates, MUXes, inverters, etc.

Dual Adder Scheme

When the addition operation is performed on the mantissas A and B, the resultant mantissa R will have a value in the range described by the notation [1,2) or in the range described by the notation [2,4). The notation [1,2) is used wherein the square bracket indicates that the one is included in the interval and the parenthesis indicates that two is not included in the interval. The same inclusiveness applies to the bracket in the notation [2,4), as well as the exclusiveness of the parenthesis. That is, for the range [1,2), the range of values is greater than or equal to one, but less than two. When mantissa R is in the range [1,2), no carry is generated. However, if the value of mantissa R is in the range [2,4) then a carry is generated. With the generation of this carry, mantissa R will need to be shifted to the right one bit position and the exponent incremented in order to normalize mantissa R.

When the subtraction operation is performed on the mantissas A and B, the difference of the two numbers, represented by mantissa R, can also fall within two separate ranges. If mantissa R falls within the range [1,2), then it is already normalized. However, if the difference of the two operands causes mantissa R to fall within the range [0.5,1), then the msb position will be represented by a place holding 0. If mantissa R falls within the range [0.5,1), then mantissa R will need to be shifted one position to the left and the exponent decremented to normalize the result. This shifting of one bit position is independent of any operation to determine further leading zeros, which if present, will need to be accounted for in normalizing the resultant mantissa R. Therefore, ignoring further normalization for leading zeros, a subtraction operation of two mantissas can result in the difference being normalized or needing a shift of one bit position to the left.

Prior art devices typically determine the range of mantissa R only after mantissa R has been calculated. That is, prior art devices typically obtain the difference of a subtraction operation and then determine if a shift is required to normalize the resultant mantissa by analyzing it, once it is obtained. The present invention circumvents the requirement for obtaining the final result and then performing the post normalization step.

Referring to FIG. 2, a two adder scheme of the present invention is shown. Two adders 1 and 2 are equivalent adders which can perform both addition and subtraction operations. Mantissa A is coupled as an input to both of the adders 1 and 2. Mantissa B is also coupled as an input to both of the adders 1 and 2. Adders 1 and 2 add/subtract mantissas A and B and output the result as an input to a MUX 3. A control signal coupled to adders 1 and 2 determines if the operation is an add operation or a subtract operation. As stated earlier the subtract operation is in reality a two's complement addition.

If an addition operation is being performed on mantissas A and B, adder 1 assumes that the resultant value resides within the range [1,2), while adder 2 presumes that the resultant value resides within the range [2,4). Because adder 2 presumes that the resultant value resides in the range [2,4), adder 2 provides a result which in effect is shifted to the right one bit position in comparison to the result of adder 1. The normal output from adder 1 and the right shifted output from adder 2 are coupled to MUX 3. A select signal selects the proper adder output to be coupled through MUX 3.

If a subtraction operation is being performed, adder 1 assumes that the value of the result resides within the range [0.5,1), while adder 2 presumes that the resultant value resides within the range [1,2). In this instance adder 1 provides a left shift of one bit position prior to providing an output to MUX 3. Adder 2 provides the normal output. Therefore, during an add or a subtract operation, both adders 1 and 2 will provide an output, but only one output has the correct normalization. MUX 3 is used to select the appropriate adder output. By using the two adder scheme of FIG. 2, additional steps are not needed to determine the range of the sum/difference mantissa. The select signal to MUX 3 is derived from additional circuitry coupled to the adders. A carry out (overflow) from adder 1 causes MUX 3 to select the output of adder 2 during an addition operation. Without the carry out, adder 1 output is selected. During a subtraction operation, the sum bit (the msb) of adder 1 is evaluated. If this sum bit has a value of 1, then adder 2 output is selected, but if the sum bit value is 0, the output of adder 1 is selected by MUX 3.

Referring to FIG. 3, adders 42, which are equivalent to adders 1 and 2 of FIG. 2, are shown as implemented in the preferred embodiment. Mantissas A' and B' are coupled to each of the adders 1 and 2. Mantissa A' is used here to denote the mantissa of the greater operand A or B and mantissa B' is used here to denote the mantissa of the lesser operand A or B. Again, the example uses the 53 bit double-precision mantissa of the IEEE 754 standard, however, it is appreciated that the actual number of bits is a design choice. Further, as practiced in the preferred embodiment, additional logic circuits are provided to process the lsb(s) (bit 0 or bits 0 and 1) which will depend on the rounding operation being required.

In FIG. 3, bits <52:1> of each mantissa A' and B' are coupled to adder 1, while bits <53:2> of each mantissa A' and B' are coupled to adder 2. Each adder is capable of outputting 52 bits. When addition is called for, adder 1 outputs bits <51:0> as input s of MUX 43 (which MUX 43 is equivalent to MUX 3 of FIG. 2) and adder 2 outputs bits <51:0> as input r of MUX 43. The bits <51:0> actually corresponds to bits <52:1> of the resultant mantissa R. Bit <0> is determined by a rounding logic circuit, which will be described later. Bit <0> is coupled to inputs r and s to provide the lsb of mantissa R.

When subtraction is to be performed, adder 1 outputs bits <50:0> as input t of MUX 43 and adder 2 outputs bits <50:0> as input u of MUX 43. The bits <50:0> actually corresponds to bits <52:2> of the resultant mantissa R. Bits <1:0> are determined by a rounding logic circuit, wherein bits <1:0> are coupled as inputs to t and u to provide the two lsb's of mantissa R.

As illustrated, the inputs to adder 2 are shifted by one bit position such that the sum/difference from adder 2 will also be shifted by one bit position in comparison to the corresponding output from adder 1. Control signals provide for the selection of inputs r, s, t and u as the output from MUX 43, which output corresponds to mantissa R. Input r is selected if addition is being performed and there is a carry generated from adder 1. If there is no carry, then input s is selected. When performing subtraction, input t is selected if the sum bit (bit <51>) of adder 1 is a 0, but input u is selected if the sum bit is a 1.

Referring to FIG. 4, a floating point adder of the preferred embodiment is shown in block diagram form. Various elements are shown in blocks and depict circuits which are well known in the general art. For example, such references being to a multiplexer, adder, comparator, subtracter, decrementor, incrementer, shifter, shift encoder, etc. It is appreciated that a variety of prior art circuits and devices can be readily implemented for each of the individual blocks. Further, the floating point adder of FIG. 4 is shown separated into three separate stages 1, 2, and 3. This is provided in FIG. 4 to illustrate that those blocks residing within stage 1, represent operations which are performed during a first clock cycle. Blocks within stage 2 represent those circuit operations being performed during a second clock cycle, and those blocks residing within stage 3 are performed during a third clock cycle. The floating point adder of FIG. 2 is a three stage pipeline machine, wherein new operands are introduced into stage 1 when results of the operation of the previous operand are shifted from stage 1 to stage 2, etc. Furthermore, although not shown, latches are provided after each stage for the purpose of coupling signals to circuits of the next stage.

Operands A and B are coupled as inputs to various blocks shown as MUX 11, exponent comparator 12, mantissa comparator 13, MUX 14, shifters 15 (which are barrel shifters), and to prenormalization logic circuit 10. Actually, either the exponent or mantissa portions are coupled to those various blocks. Exponent comparator 12 compares and determines the difference of the exponent values for operands A and B, and provides the exponent difference to a right shift encoder 16. The right shift encoder provides the proper encoding to perform a right shift operation to one of the shifters 15. Comparator 12 also provides a signal EA=EB. If EA≠EB, then a second signal determines if EA>EB or if EA<EB. It is to be noted that if EA is not greater than EB, then the signal state identifies the sate EA<EB (assuming EA≠EB). These signals are coupled to the mantissa comparator 13.

Mantissa comparator 13 receives the mantissas of operands A and B and the carry out of the prenormalization circuit 10, and compares the two mantissas, if needed, to determine which is larger in magnitude. If EA=EB, then the mantissas must be compared, otherwise the signal EA>EB will determine which operand is greater. In actual practice, comparator 13 is an equality comparator which determines if mantissas A and B are equal. If not equal and EA=EB, then the carry-out from the subtractor 25 of circuit 23 (see FIG. 1) is looked at to determine if mantissa A>mantissas B, or if mantissa B>mantissa A. The signals A>B, A=B and A<B refer to the comparisons as applied to operands (i.e. A>B means operand A is greater than operand B). The exponent comparison signals are also coupled to prenormalization logic 10, wherein three logic circuits 21, 22 and 23 determine the number of leading zeros which will be expected in the resultant mantissa.

Prenormalization logic circuit 10 is earlier described in reference to FIG. 1 and employs the prenormalization technique described earlier to determine the number of leading zeros which is to be expected in mantissa R, which determination can be off, at most, by 1. Logic circuits 21 and 22 are used to detect the bit pattern discussed in reference to case I, such that leading 0s are outputted from circuits 21 and 22, corresponding to the leading 0s of mantissa R. The detection logic discussed in regards to case I is used to provide the prenormalization. It is appreciated that various logic implementation can be provided to scan the bits of the mantissas A and B.

Circuit 23 is essentially a subtracter 25 and MUX 26 for subtracting the two mantissas A and B. Circuit 23 assumes that the mantissas A and B are of the same exponential order. Various logic circuits can be readily used for subtracter 25 of circuit 23. Subtracter operation is discussed fully in reference to FIG. 1. Thus prenormalization is provided by circuit 23 when case III (EA=EB) occurs. It is to be noted that circuits 21-23 are also referred to as scanners, since the circuits 21-23 essentially function to scan the bit pattern of the mantissas A and B.

The outputs of circuits 21, 22 and 23 are coupled to MUX 24, which is also coupled to receive exponent determined control signals from comparator 12. It is appreciated that the prenormalization circuit 10 functions as though prenormalization is needed for each pair of operand inputs. That is, circuits 21-23 operate on the input operands and the selection of the correct output from one of the circuits 21-23 is provided by the control signals coupled to control the selection of MUX 24 to output the correct output. Further, it is appreciated that when the earlier described case II occurs, prenormalization is not required, but either output of circuit 21 or 22 will be coupled through MUX 24. However, as will be described in the description referencing stage 2, the output from MUX 24 is ignored.

Further, in stage 1, MUX 11, under control of the EA>EB signal, passes the larger of the exponents EA or EB to precision conversion circuit 27, which adjust the bias of the result exponent depending on a conversion from single to double or from a double to single precision. That is, the floating point adder of the present invention supports additions with double precision inputs but having single precision output, or vice versa. The IEEE standard has different bias adjust for double numbers and single numbers. Therefore, after the double precision numbers are added, the exponent must be adjusted to contain a single position bias for a double to single add operation. Equivalent situation applies to single to double add operation conversion. Further, mantissas of operands A and B are coupled to MUX 14, wherein MUX 14 selects the smaller operand for the sticky bit scanner under control of signal EA>EB from comparator 12. When EA=EB, no differentiation is needed since mantissa alignment is not needed. The output of MUX 14 is coupled to a sticky bit scanner 28, wherein scanner 28 scans at the "nibble" (nibble is used to reference a 4-bit grouping and is described later in reference to the determination of a sticky bit) level for those bits which will be ORed to obtain the sticky bit.

In stage 2, a subtracter 30, which receives its input from the precision conversion circuit 27, also receives a left shift amount signal from a left shift encoder 31. Left shift encoder 31 detects the number of leading zeros outputted from the prenormalization logic circuit 10 and coupled through MUX 24, and encodes the amount of left shifts needed. The left shift signal from encoder 31 is coupled to shifters 15 and to subtactor 30. Therefore, in the event of prenormalization, the amount of left shifts required of the mantissas will be subtracted from the exponent value in subtracter 30.

Shifters 15 are actually comprised of two shifters, one for each mantissa A and B. The left shift signal from left shift encoder 31 shifts both mantissas to the left by the amount determined by encoder 31. This left shift operation of both mantissas A and B is for the purpose of prenormalizating the operand mantissas before performing the subtraction operation. The right shift signal from right shift encoder 16 right shift(s) only the smaller mantissa if EA≠EB. The signal EA>EB from comparator 12 determines which mantissa has the greater exponent. That is, when EA=EB, no right shift is needed. Only left shift(s) determined by the left shift encoder apply to both shifters. When the exponent difference is greater than 1 (absolute value of (EA−EB)>1), no left shifts are required and only right shift(s) determined by the right shift encoder 16 apply to the mantissa of the smaller operand, which is determined by the signal EA>EB. If the exponent difference is 1, then the left shift(s) for prenormalization is provided by encoder 31 and a single shift right of the mantissa of the lesser operand is provided by a 1 bit shift. In actual practice, a single bit shift MUX is used to provide the 1 bit right shift when the exponent difference is one. That is, the lesser operand's mantissa is loaded into the shifter having a 1 bit position displacement. By using this technique only a right or left (but never both) shifts are needed for each of the cases encountered.

The two shifters 15 of the preferred embodiment are barrel shifters. Shifters 15 are coupled to a swapper 33 which swaps the mantissas, if necessary, to always have the greater operand as operand A' and the lesser operand as operand B'. The swapper 33 is controlled by the control signal A>B from comparator 13. Thus, the two outputs from swapper 33 will always have the greater number as the minuend as represented by operand A'. Additionally, the output of the sticky bit scanner 28 is coupled to a sticky bit determining circuit 35, which is then coupled to a rounding logic circuit 36 for determining the rounding action which is needed in implementing a predetermined rounding standard. Circuit 35 receives the nibble level (four bits) sticky bit information and determines the actual sticky bit.

In stage 3, the output of subtracter 30 is coupled to MUX 37 through three separate routes. One output of subtracter 30 is passed through a decrementer 38 prior to being coupled to MUX 37. A second output is coupled through an incrementer 39 prior to being coupled to MUX 37. The third output is coupled directly to MUX 37. MUX 37 selects one of these inputs as its output. The incremented exponent is chosen if the final mantissa has to be right shifted by one position. The decremented exponent is selected if the final mantissa has to be left shifted. If no shifting is to be done to the final mantissa, then the unmodified exponent is selected. The output of MUX 37 represents the exponent of the resultant mantissa R. The output of MUX 37 is also coupled to an overflow/underflow logic circuit 40 for detecting overflow and underflow conditions.

The outputs of the swapper 33 are coupled to adders 42. The circuit of adders 42 is equivalent to the two adder scheme of FIG. 3. Four separate outputs r, s, t and u are shown from adders 42 to represent the two outputs for addition and the two outputs for subtraction. The two adder scheme provides for a properly normalized mantissa R in the same clock cycle that addition or subtraction is performed. The control signals to MUXs 37 and 43 are derived from logic which looks to the carry out or the sum bit as discussed earlier in reference to FIG. 3. The rounding logic 36 provides the lsb bit(s) to each of the adder outputs. Further, a first carry-in bit is coupled from rounding logic circuit 36 to one of the adders 42 and a second carry-in bit to the other of the adders 42, wherein these carry bits operate to provide the necessary rounding according to a predetermined rounding standard.

It is to be appreciated that during the first clock cycle (stage 1), the exponents of the operands are being operated on to determine the difference of the exponents, the mantissas are being compared and prenormalization logic is calculating the left shifts necessary to normalize the resultant mantissa R. By using the prenormalization logic 10 the additional step of postnormalizing the resultant mantissa R is eliminated thereby saving at least one clock cycle. Further, the smaller operand mantissa is being scanned to select those bits which will be used to determine the sticky bit by the sticky bit circuit 28 and 35.

During the second clock cycle, right or left shifts are performed on the mantissa(s) and the swapper selects the mantissa of the greater operand as the minuend. This swapping also has an added advantage of eliminating post complimentary requirements and saving at least one more clock cycle. Because the mantissa of the floating point operand is represented in sign magnitude form, a negative result after the two's complement adder will have to be converted back to a positive value with a change in the resultant sign bit. However, by making sure that the final result is positive, the post complement process can be eliminated. In this instance, swapper 33 will make sure that operand A' is always bigger in magnitude than operand B', such that the sign of the final result will be of the same sign as that of operand A'. The selection of the larger magnitude exponent is achieved by MUX 11. If EA equals EB, then either of the exponents is passed.

Also, during the second clock cycle, computation of the final sticky bit is performed in sticky bit determiner circuit 35. Then, this value is used to determine the rounding in rounding logic circuit 36. Three sets of computations are made in regard to the sticky bit, rounding bit and the lsb in order to predetermine the rounding action needed for the resultant mantissa R. The three sets of computations are for the normal case requiring no shift, a right shift case when an addition result is in the range [2,4), and a left shift case when a subtraction result is in the range [0.5,1). Although a variety of predetermined rounding standards can be used, the rounding action of the preferred embodiment is described in the next section. Also during the second clock cycle, any needed modifications to the exponent due to prenormalization is achieved in subtracter 30.

During the third clock cycle, the exponent is incremented or decremented, if needed, and the proper exponent value is outputted. Also during the third clock cycle, the two adders perform the addition/subtraction operation together with the rounding and the properly shifted/unshifted output is selected.

ROUNDING

The rounding action of the floating point adder of the present invention is performed in two stages. The sticky bit is precalculated in stage 1 through the sticky bit scanner 28 at the nibble (4 bit grouping) level. That is, scanner 28 selects those nibbles of the smaller mantissa which will be ORed to provide the sticky bit. The final bit level determination and the ORing is done by circuit 35 in stage 2. In stage 2 the final sticky bit, rounding bit and the least significant bit are calculated for three possible situations, which are based on no shift result, a left shift result, and a right shift result. The rounding action is dependant on the sticky bit, the rounding bit and on the prerounded least significant bit.

The following definition is used to define acronyms used in describing the rounding action of the present invention.

Definitions:
R': IEEE 754 rounding bit
S': IEEE 754 sticky bit
L': pre-rounded least significant bit
L: rounded least significant bit
SF: final sign of result (sign flag); 0 if positive, 1 if negative For rounding to the nearest even, determined by the equation $R'(S'+L')$, the following occurs.

| Case | L' | R' | S' | L | Rounding | Reason |
|---|---|---|---|---|---|---|
| 1 | 0 | 0 | 0 | 0 | no | exact result |
| 2 | 0 | 0 | 1 | 0 | no | inexact result; rounded properly |
| 3 | 0 | 1 | 0 | 0 | no | tie case; but result is already even |
| 4 | 0 | 1 | 1 | 1 | yes | round up |
| 5 | 1 | 0 | 0 | 1 | no | exact result; |
| 6 | 1 | 0 | 1 | 1 | no | inexact result; rounded properly |
| 7 | 1 | 1 | 0 | 0 | yes | tie case; round to nearest even |
| 8 | 1 | 1 | 1 | 0 | yes | round up |

In this event, cases 4, 7 and 8 require rounding action.

For rounding to positive infinity, determined by the equation $(R'+S')SF/$, the following occurs.

| SF | L' | R' | S' | L | Rounding action |
|---|---|---|---|---|---|
| 0 | 0 | 0 | 0 | 0 | no |
| 0 | 0 | 0 | 1 | 1 | yes |
| 0 | 0 | 1 | 0 | 1 | yes |
| 0 | 0 | 1 | 1 | 1 | yes |
| 0 | 1 | 0 | 0 | 1 | no |
| 0 | 1 | 0 | 1 | 0 | yes |
| 0 | 1 | 1 | 0 | 0 | yes |
| 0 | 1 | 1 | 1 | 0 | yes |
| 1 | 0 | 0 | 0 | 0 | no |
| 1 | 0 | 0 | 1 | 0 | no |
| 1 | 0 | 1 | 0 | 0 | no |

-continued

| SF | L' | R' | S' | L | Rounding action |
|---|---|---|---|---|---|
| 1 | 0 | 1 | 1 | 0 | no |
| 1 | 1 | 0 | 0 | 1 | no |
| 1 | 1 | 0 | 1 | 1 | no |
| 1 | 1 | 1 | 0 | 1 | no |
| 1 | 1 | 1 | 1 | 1 | no |

Likewise for rounding to negative infinity, determined by the equation $(R'+S')SF$, the following occurs.

| SF | L' | R' | S' | L | Rounding action |
|---|---|---|---|---|---|
| 0 | 0 | 0 | 0 | 0 | no |
| 0 | 0 | 0 | 1 | 0 | no |
| 0 | 0 | 1 | 0 | 0 | no |
| 0 | 0 | 1 | 1 | 0 | no |
| 0 | 1 | 0 | 0 | 1 | no |
| 0 | 1 | 0 | 1 | 1 | no |
| 0 | 1 | 1 | 0 | 1 | no |
| 0 | 1 | 1 | 1 | 1 | no |
| 1 | 0 | 0 | 0 | 0 | no |
| 1 | 0 | 0 | 1 | 1 | yes |
| 1 | 0 | 1 | 0 | 1 | yes |
| 1 | 0 | 1 | 1 | 1 | yes |
| 1 | 1 | 0 | 0 | 1 | no |
| 1 | 1 | 0 | 1 | 0 | yes |
| 1 | 1 | 1 | 0 | 0 | yes |
| 1 | 1 | 1 | 1 | 0 | yes |

For truncate cases, no rounding is required.

In order to calculate rounding before the final result R, sign flag must be determined first. For cases where the exponents of the operands are different, SF can be determined immediately after the exponent substract stage. However, in the instances where the exponents are the same and the operation is a subtract, the swapper 33 ensures that the final resultant will have the same polarity as operand A' (minuend). That is, SF will have the same polarity as operand A'. Thus, the rounding action can be determined prior to actually obtaining the resultant mantissa R. The rounding logic can be implemented using truth tables as shown above, such that a carry is generated from the rounding logic when the mantissa R's lsb is to be incremented. The rounding logic circuit 36 provides this function in stage 2. A carry bit is coupled as a carry-in to each adder 42 and is applied during stage 3.

In an addition operation, if rounding action is required, 1 is added to the lsb to produce the final lsb. There may be a carry generated due to the addition of adding the 1 to the lsb and this carry (referenced b) will be the carry input to the adders.

However, subtraction is more difficult since two carries may be generated. In subtraction a case may be present when a first carry is generated due to two's complement addition (which carry is referenced "c") at the lsb and a second carry (which is referenced "b") is generated due to the rounding action. If this occurs, one option is to use a carry save adder to sum the two carries b and c before providing them to the adders 42.

In further definition of terms, the following is defined in reference to the subtraction rounding operation of the present invention.

Definitions:
ml: lsb of minuend
sl: lsb of subtrahend
sr: subtrahend round bit
ss: subtrahend sticky bit b: carry out due to rounding
c: carry out due to two's complement Thus the two mantissas are in the form shown below:

|           |                |
|-----------|----------------|
| mantissa A | X ... XX ml 0 0 |
| mantissa B | X ... XX sl sr ss |

Note that ss is actually an OR of a number of bits as earlier explained. The following bit sequence illustrates the results of obtaining the final L, R, and S for subtraction for the IEEE 754 rounding standard.

| ml | sl | sr | ss | 2's comp of sl, sr, ss | final (L', R', S') before rounding | rounding action (add 1 to L') | final L, R, S |
|----|----|----|----|------------------------|-----------------------------------|-------------------------------|---------------|
| 0 | 0 | 0 | 0 | c000 | c000 | no  | c000 |
| 0 | 0 | 0 | 1 | 111  | 111  | yes | b011 |
| 0 | 0 | 1 | 0 | 110  | 110  | yes | b010 |
| 0 | 0 | 1 | 1 | 101  | 101  | yes | b001 |
| 0 | 1 | 0 | 0 | 100  | 100  | no  | 100  |
| 0 | 1 | 0 | 1 | 011  | 011  | yes | 111  |
| 0 | 1 | 1 | 0 | 010  | 010  | yes | 110  |
| 0 | 1 | 1 | 1 | 001  | 001  | yes | 101  |
| 1 | 0 | 0 | 0 | c000 | c100 | no  | c100 |
| 1 | 0 | 0 | 1 | 111  | c011 | yes | c111 |
| 1 | 0 | 1 | 0 | 110  | c010 | yes | c110 |
| 1 | 0 | 1 | 1 | 101  | c001 | yes | c101 |
| 1 | 1 | 0 | 0 | 100  | c000 | no  | c000 |
| 1 | 1 | 0 | 1 | 011  | 111  | yes | b011 |
| 1 | 1 | 1 | 0 | 010  | 110  | yes | b010 |
| 1 | 1 | 1 | 1 | 001  | 101  | yes | b001 |

In this instance a carry save adder to add both carries b and c is not needed because they can never be 1 at the same time. When rounding is required and c equals 1, R' is always 0, so b cannot be 1. In the instance ml sl sr ss=1000, R'=1 and c=1, but rounding action is not required so b is still 0. Therefore, the carry input to the adders 42 in subtraction can be the OR function of b and c.

This rounding action is determined in rounding logic 36 such that a carry is generated from rounding logic 36 as a carry into adders 42. By the utilization of the rounding logic of the present invention, the rounding operation can be performed at the same time the two operand mantissas are being added/subtracted so that post rounding operations are not required. Further, the sticky bit generation which is required for the IEEE 754 rounding support is defined as the OR of all of the bits to the right of the round bit. The floating point adder of the present invention prescans the sticky bit after the exponent difference is detected. The exponent difference indicates which mantissa operand has to undergo the right shift, such that the sticky bit scanner 28 scans the corresponding mantissa to determine the value of the sticky bit. The preferred embodiment uses scanner 28 and 35 to scan the corresponding mantissa on a nibble basis depending on the result precision.

Additionally, three separate rounding computations are made in stage 2 of the adder. The first adder, adder 1 of FIG. 3, is used for the normal addition, wherein the resultant mantissa is in the range of [1,2). The first adder provides for a left shift to subtraction when the range is [0.5,1). In case of normal addition, the rounding action is carried out at the normal lsb position of the adder. In the event of the left shift subtraction, the rounding action is carried out one bit to the right of the normal least significant bit position.

The second adder, adder 2 of FIG. 3, is used for normal subtraction, wherein, mantissa R is in the range [1,2). The second adder provides for a right shift addition when the range is [2,4). For this addition the rounding action is carried out one bit position to the left of the lsb of the normal addition result. For subtraction, the rounding action is carried out at the normal lsb position of the normal subtraction result.

In stage 2 the final sticky bit, rounding bit and least significant bits are calculated for the three situations, which are based on a normal result, a left shift result and a right shift result, depending on the operation to be performed. For an addition operation, the normal result calculation is coupled as a carry-in to adder 1 and right shift result calculation to adder 2. For subtraction, the normal result calculation is coupled as a carry-in to adder 2 and left shift result calculation to adder 1.

The floating point adder of the preferred embodiment calculates mantissa R bit<0> for addition and bits <1:0> for subtraction in accordance with the rounding action being performed, while also providing the carry bits to the two adders 42. It is appreciated that the adders 42 can be readily configured to operate on the lsb(s), wherein the appropriate carry bit to each adder will provide the rounding. That is, instead of bit <0> and bits <1:0> being coupled as inputs to MUX 43, the carry bits to the two adders will provide the rounding. Instead of the rounding logic 36 generating bit <0> and bits <1:0>, adder 42 will operate on mantissa lsb bits. For adder 1 in FIG. 3, it will operate on bits <52:0> and for adder 2 <53:1>. The technique of the present invention, where the lsb(s) are calculated outside of the adders 42 in the rounding logic, is for exemplary purpose and is not intended to limit the present invention.

Thus, a floating point adder which utilizes a dual adder scheme and which includes a prenormalization logic circuit and rounding logic circuit for determining the necessary normalization and rounding of the resultant answer prior to actually obtaining the resultant answer is described. It is to be appreciated that the floating point adder of the present invention is embodied in a semiconductor integrated circuit and further operates on an operand having a 53-bit mantissa and an 11-bit exponent for double precision, and a 24-bit mantissa and an 8-bit exponent for single precision. When performing single precision calculation in the adders, the earlier descriptions to double precision examples apply as well. Place holding values, be it 0 or 1, are used to fill in the unused bit positions. Further, it is to be appreciated that although the floating-point adder of the present invention is described in applying the IEEE 754 standard, other standards can be readily applied without departing from the spirit and scope of the present invention.

We claim:

1. In a floating-point adder for performing a subtraction operation by subtracting a first operand from a second operand to obtain a difference, a prenormalization circuit for prenormalizing mantissas of said operands prior to performing said subtraction operation, comprising:

a first logic circuit coupled to receive mantissas of said operands for logically operating on said mantissas to predict a number of leading 0s in a resultant mantissa of said difference if said exponent value of said first operand is greater in magnitude than said exponent value of said second operand by a value of one;

a second logic circuit coupled to receive mantissas of said operands for logically operating on said mantissas to predict a number of leading 0s in said resultant mantissa if said exponent value of said second operand is greater in magnitude than said exponent value of said first operand by a value of one;

a third logic circuit coupled to receive mantissas of said operands for logically operating on said mantissas to predict a number of leading 0s in said resultant mantissa if said exponent values of said operands are equal;

shifter means coupled to receive said mantissas of said operands and outputs from said first, second and third logic circuits for shifting said operands to prevent leading 0s from occurring in said resultant mantissa;

wherein said exponent value of said first operand is greater in magnitude than said exponent value of said second operand by a value of one, said shifter means causes each of said operands to be shifted by a number determined by said output of said first logic circuit;

if said exponent value of said second operand is greater in magnitude than said exponent value of said first operand by a value of one, said shifter means causes each of said operands to be shifted by a number determined by said output of said second logic circuit; and if said exponent value of said operands are equal, said shifter means causes each of said operands to be shifted by a number determined by said output of said third logic circuit;

said shifted operands provide said resultant mantissa which does not require post-normalization.

2. The prenormalization circuit of claim 1, wherein said first logic circuit scans for a first string of 0s following the most significant bit (msb) of said first operand mantissa and for a first string of 1s to correspond to said first string of 0s commencing at the msb of said second operand mantissa to predict said number of leading 0s in said resultant mantissa; and wherein said second logic circuit scans for a second string of 0s following the msb of said second operand mantissa and for a second string of 1s to correspond to said second string of 0s commencing at the msb of said first operand mantissa, to predict said number of leading 0s in said resultant mantissa.

3. The prenormalization circuit of claim 2, wherein said third logic circuit is a subtracter for subtracting said first operand mantissa from said second operand mantissa to predict said number of leading 0s in said resultant mantissa.

4. The prenormalization circuit of claim 3, wherein each of said first, second and third logic circuits predict its number of leading 0s during a first clock cycle and said shifter means performs shifting of said operands during a second clock cycle prior to performing said subtraction operation during a third clock cycle.

5. The prenormalization circuit of claim 1, wherein each of said first, second and third logic circuits predict its number of leading 0s during a first clock cycle and said shifter means performs shifting of said operands during a second clock cycle prior to performing said subtraction operation during a third clock cycle.

6. The prenormalization circuit of claim 1, wherein said first logic circuit is a subtractor for subtracting said first operand mantissa from said second operand mantissa, said second logic circuit is a subtractor for subtracting said second operand mantissa from said first operand mantissa, and said third logic circuit is a subtractor for subtracting said first operand mantissa from said second operand mantissa to predict said number of leading 0s in said resultant mantissa.

7. In a floating-point adder for performing a subtraction operation by subtracting a first operand from a second operand to obtain a difference, a prenormalization circuit for prenormalizing said operands prior to performing said subtraction operation, comprising:

a comparator coupled to receive exponent values of said operands for comparing said exponent values to determine if said exponent values are equal, and if not equal determining which of said exponent values is greater in magnitude;

a first logic circuit coupled to receive mantissas of said operands for logically operating on said mantissas to predict a number of leading 0s in a resultant mantissa of said difference if said exponent value of said first operand is greater in magnitude than said exponent value of said second operand by a value of one;

a second logic circuit coupled to receive mantissas of said operands for logically operating on said mantissas to predict a number of leading 0s in said resultant mantissa if exponent value of said second operand is greater in magnitude than said exponent value of said first operand by a value of one;

a third logic circuit coupled to receive mantissas of said operands for logically operating on said mantissas to predict a number of leading 0s in said resultant mantissa if said exponent values of said operands are equal;

selecting means coupled to receive control signals from said comparator and also coupled to receive outputs from said first, second and third logic circuits, for selecting one of said logic circuit outputs corresponding to said control signals from said comparator;

first storage means coupled to receive mantissas of said first operand;

second storage means coupled to receive mantissas of said second operand;

shifter means coupled to said first and second storage means and to said selecting means for shifting said mantissas stored in said storage means a number of bit positions determined by one of said logic circuit outputs selected by said selecting means;

wherein subsequently performing said subtraction operation on said shifted mantissas provides an already normalized result.

8. The prenormalization circuit of claim 7, wherein said first logic circuit scans for a first string of 0s following the most significant bit (msb) of said first operand mantissa and for a first string of 1s to correspond to said first string of 0s commencing at the msb of said second operand mantissa to predict said number of leading 0s in said resultant mantissa; and wherein said second logic circuit scans for a second string of 0s following the msb of said second operand mantissa and for a second string of 1s to correspond to said second string of 0s commencing at the msb of said first operand mantissa, to predict said number of leading 0s in said resultant mantissa.

9. The prenormalization circuit of claim 8, wherein said third logic circuit is a subtracter for subtracting said first operand mantissa from said second operand mantissa to predict said number of leading 0s in said resultant mantissa.

10. The prenormalization circuit of claim 9 wherein said selecting means is comprised of a multiplexer.

11. The prenormalization circuit of claim 10, wherein each of said first, second and third logic circuits predict its number of leading 0s during a first clock cycle and said shifter means performs shifting of said operands during a second clock cycle prior to performing said subtraction operation during a third clock cycle.

12. The prenormalization circuit of claim 7, wherein each of said first, second and third logic circuits predict its number of leading 0s during a first clock cycle and said shifter means performs shifting of said operands during a second clock cycle prior to performing said subtraction operation during a third clock cycle.

13. In a floating-point adder for performing a subtraction operation by subtracting a first normalized operand from a second normalized operand to obtain a normalized difference, a prenormalization circuit for prenormalizing said operands prior to performing said subtraction operation, comprising:

a comparator coupled to receive exponent values of said operands for comparing said exponent values to determine if said exponent values are equal, and if not equal determining which of said exponent values is greater in magnitude;

a first scanner coupled to receive mantissas of said operands for scanning for first string of 0s following the most significant bit (msb) of a first operand mantissa and for a first string of 1s to correspond to said first string of 0s commencing at the msb of a second operand mantissa, wherein an AND operation of corresponding bits of one of said first strings to a complement of other of said first strings provides a first number of leading 0s;

a second scanner coupled to receive mantissas of said operands for scanning for a second string of 0s following the msb of said second operand mantissa and for a second string of 1s to correspond to said second string of 0s commencing at the msb of said first operand mantissa, wherein an AND operation of corresponding bits of one of said second strings to a complement of other of said second strings provides a second number of leading 0s;

a subtracter coupled to receive mantissas of said operands for subtracting said second operand mantissa from said first operand mantissa and providing a third number of leading 0s;

a multiplexer coupled to receive said first, second and third number of leading 0s from said first scanner, second scanner and subtracter and also coupled to said comparator for receiving control signals indicative of comparison of said exponent values, wherein said multiplexer selects said first number of leading 0s when exponent value of said first operand is greater than exponent value of said second operand, selects said second number of leading 0s when exponent value of said second operand is greater than exponent value of said first operand, and selects said third number of leading 0s when exponent values of said operands are equal;

an encoder coupled to receive a selected number of leading 0s from said multiplexer for encoding said selected number of leading 0s to a left shift signal;

a shifter coupled to receive mantissas of said operands and left shifting both mantissas of said operands a number of bit positions determined by said left shift signal when exponent difference is not greater than one;

wherein subsequently performing said subtraction operation on said shifted mantissa requires no postnormalization.

14. The prenormalization circuit of claim 13 wherein said subtracter further includes a second multiplexer coupled to receive an output of said subtracter and a complement of said output of said subtracter, wherein a carry signal from said subtracter controls the selection of said output or its complement to be coupled to said first multiplexer, such that when said first operand mantissa is greater than said second operand mantissa, said carry signal is generated to select said output, but when said first operand mantissa is not greater than said second operand mantissa, said carry signal is not generated and said output complement is selected.

15. The prenormalization circuit of claim 14 wherein said comparator, first and second scanners, subtracter and first multiplexer perform their functions during a first clock cycle; and said encoder and shifter perform their functions during a second clock cycle.

16. The prenormalization circuit of claim 13 wherein said comparator, first and second scanners, subtracter and first multiplexer perform their functions during a first clock cycle; and said encoder and shifter perform their functions during a second clock cycle.

* * * * *